Sept. 21, 1965 G. STEENHAGEN 3,206,805
INSULATED WALL STRUCTURE
Filed March 12, 1963

GERRIT STEENHAGEN,
INVENTOR.

BY HIS ATTORNEYS

HARRIS, KIECH, RUSSELL & KERN.

United States Patent Office 3,206,805
Patented Sept. 21, 1965

3,206,805
INSULATED WALL STRUCTURE
Gerrit Steenhagen, Montrose, Calif., assignor to Elmwood Liquid Products, Inc., New York, N.Y., a corporation of New York
Filed Mar. 12, 1963, Ser. No. 264,582
3 Claims. (Cl. 20—92)

This invention relates to heat insulation structures and, more particularly, provides an improved wall structure.

Insulating walls utilizing a plurality of layers made of, for example, plastic foam, arranged in side-by-side relationship to provide a laminated structure have been suggested before as disclosed in copending application Serial No. 158,906, Carter, having the same assignee as the instant patent application and filed December 12, 1961. In the Carter structure each layer preferably comprises two slabs or blocks disposed end-to-end. With such a laminated structure, harmful cracks that formerly occurred in a single layer structure are avoided. Cracks, once started in plastic foam or the like, usually at the inner surface, gradually spread toward the outer surface under the repeated cycles of warming and cooling to which insulation structures are commonly subjected. In time, cracks will extend through a one layer insulation, providing paths of increased heat conductivity and avenues for travel of moisture to the inner surface. The use of a plurality of layers as suggested in the Carter application improves significantly the reliability of the insulation since, if for any reason a crack does form in one of the layers, it can only progress through that layer. This prevents local breakdown of insulation which often happens when a crack progresses all the way through a single layer type insulation structure. It has also been found that the use of several layers minimizes stress formation in any one layer because of the relatively small temperature differential across each layer compared to the much greater temperature differential inherent in a structure having a single relatively thick layer.

As reported in the Carter application, the use of a plurality of blocks in each layer further reduces stress formation. It is known that such a construction minimizes the likelihood that contraction at the inside face of one of the relatively short blocks of a layer will exceed the strength of the insulating material; i.e. the magnitude of stress formation in a long one-piece layer is inherently greater. The individual blocks of insulation of a layer are free to contract and slide individually and, in this respect, move to relieve stress formation.

In one type of corner structure, as disclosed in the copending Carter application, the plurality of layers of one wall panel together with the layers of a transverse and adjoining panel provide a corner which in cross section has a "stairstep" appearance, with the outside insulation layer of the two panels being the longest and having one of the outside layers cut short to abut against the side of the other, and with each succeeding inner pair of layers being similarly arranged. In this "stairstep" corner structure, contraction of the blocks of the complementary layers of the two panels results in contraction in two directions, away from the joint, with the result that there will appear a relatively open (though zig-zag) path for entrance of air and migration of moisture.

It is, therefore, an object of this invention to provide an improved corner structure for a multilayer insulation structure.

A still further object of the invention is to provide an improved insulation structure suitable for use through a wide range of temperatures, which structure has an improved corner having a design that results in a minimum opening for entrance of air and migration of moisture.

The improved insulated wall structure of the invention utilizes an elongated corner member disposed lengthwise of the corner. The corner member has a triangular cross section with the apex of the triangle extending outwardly of the structure and with the base of the triangle being placed crosswise of the corner. The layers of the adjoining wall panels which are adjacent the corner member have their respective ends cut at an angle to substantially parallel the base of the corner member. Preferably, a sheet of metal foil extends along the outside face of one layer of one wall panel and continues along the interface between the end of that layer and the base of the corner member, and from there along the inside face of the complementary layer of the other wall. It is an object of the invention to provide such a structure.

The use of the triangular elongated corner member provides a more restrictive, circuitous path to convection flow in the gaps that open up with the contraction of the individual layers away from the corners, upon exposure to extremely low temperatures.

The corner structure of the invention may be incorporated in various insulated enclosures. The structure is readily fabricated and may be assembled with a minimum of effort.

It is a further object of the invention to provide an improvement in a multilayer wall panel of the type having two or more blocks or slabs arranged end-to-end within each layer. In the improved wall panel of the invention, the adjoining ends of adjacent blocks of a layer are cut at an angle across their respective thicknesses in contradistinction to the square cut employed in the Carter structure described above. This arrangement provides a longer and more narrow gap between the adjacent blocks. The effective width of the path to heat flow becomes the actual width of the gap times the sine of the angle of the cut and the effective length of the gap is the thickness divided by the sine of the angle of the cut.

Other objects of the invention will become apparent to those skilled in this art upon reference to the accompanying specification and drawing which disclose a presently preferred form of the structure of the invention. In the drawing.

Figure 1:
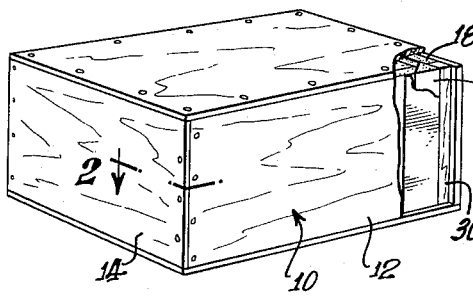
FIG. 1 is an isometric view, partially cut away, of a shipping container having a corner constructed in accordance with the invention.
Figure 2:
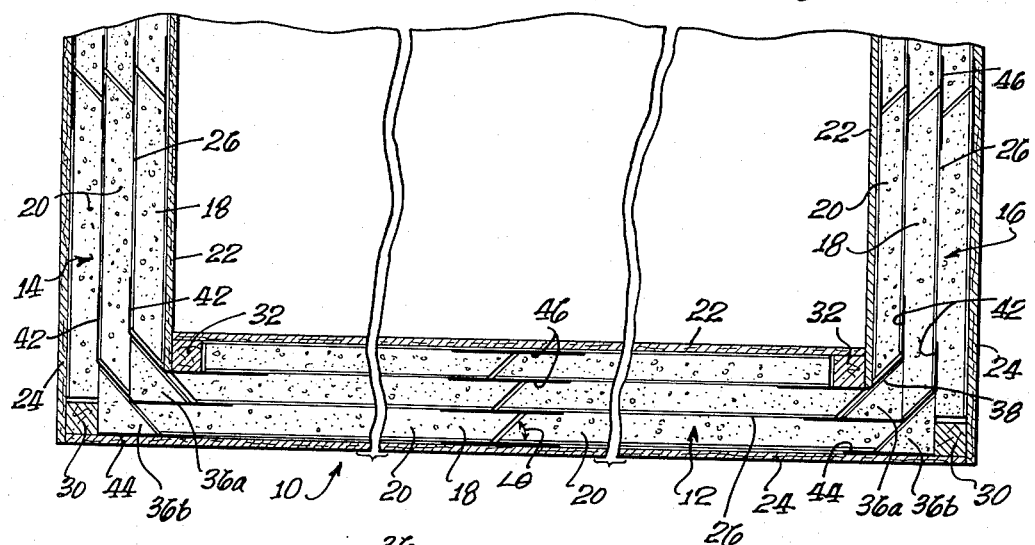
FIG. 2 is a fragmentary sectional view taken along line 2—2 of the container of FIG. 1.
Figure 3:
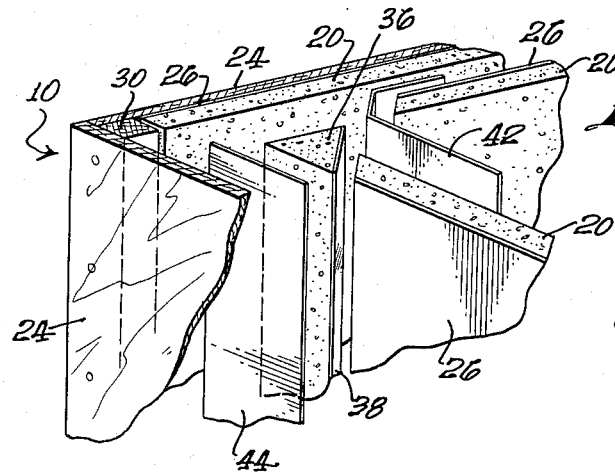
FIG. 3 is an isometric, exploded view of a portion of one corner of the container showing in greater detail the relationship of the parts thereof.

An insulated container 10 incorporating the improved corner structure of the invention is shown in FIGS. 1–3 inclusive. Side panel 12 and its adjoining end panels 14 and 16 each comprise a plurality of insulation layers 18 formed of a plastic foam, preferably polyurethane or polystyrene or other suitable material. In the embodiment illustrated, each panel comprises three layers 18, each layer made up of several insulation blocks 20 which are disposed in end-to-end relationship. The panels have an inner wall 22 and an outer wall 24, preferably formed of plywood and impervious to moisture and other vapors. As best seen in the exploded views of FIGS. 3 and 4, the outside surfaces of the several blocks 20 have bonded thereto thin metallic sheeting 26. The thin metallic sheeting 26 not only provides slip planes between adjoining insulation layers 18, but also significantly improves the insulation quality of the container 10 by providing a very effective thermal barrier to radiation.

The metallic sheeting used is preferably made of a metal foil; for example, aluminum foil. Normally the thickness of the foil will be in the range of 0.0005 inch to 0.0015 inch. However, a foil thicker or somewhat thinner than the aforementioned range may be employed. There are various adhesives available suitable for bonding the metallic sheeting or foil skin to the plastic foam board. Among these adhesives are the contact rubber or latex base materials and the silicone resin type adhesives.

Various plastic foams may be formed in rigid board form for use in the fabrication of the blocks 20 of the layers 18 of the wall panels. While polyurethane and polystyrene type foams are the preferred construction materials, various other ones of the important thermosetting synthetic resins may also be foamed, including the various epoxise and phenolic resins.

In the particular embodiment illustrated in the drawings, vertical wooden corners posts 30 of square cross section are provided at the outside corners of the structure to which the outer plywood walls 24 are nailed. Similarly, vertical wooden posts 32 are provided at the inner corners of the structure to which the inner plywood walls 22 are nailed.

Each corner of the particular embodiment illustrated has two elongated corner members 36 disposed lengthwise thereof. The corner members 36 are desirably made of the same foam plastic or other insulating materials of which the insulation layers 18 are fabricated. The corner members 36 have a triangular cross section, preferably that of an isosceles triangle, and are positioned with the apex of the triangle extending outwardly of the structure and with the base thereof placed crosswise of the corner. The base of each corner member 36 preferably has bonded thereto a metal foil sheeting 38. The respective blocks 20 adjoining the base of each of the corner members 36 have their respective ends cut to substantially parallel the adjacent base. The inner corner member 36a of each corner of the structure has its apex substantially abutting the base of its companion outer corner member 36b.

As best seen in FIGS. 2 and 3, a sheet of metal foil 42, the height of the corner, extends along the outside face of one layer of one of the end panels and continues along between the end of that layer and the base of the corner member 36 and from there along the inside face of the complementary layer of the other end wall. This arrangement provides a block in the metal foil sheeting to the radiation of heat between adjoining layers. Each elongated corner member 36 has such an arrangement. The metal foil sheeting may be of the same gauge or somewhat heavier than that employed for surfacing the plastic foam boards out of which the blocks 20 of the insulation layers 18 are made.

Reference to FIG. 2 will show that the outer layers 18 of the two respective end panels 14 and 16 nearly abut the outside wooden corner posts 30, there being a small space between the end of each layer and the corner post. The outer triangular corner member 36b of each corner has one of its sides placed against both the corner post 30 and the abutting outer layer 18 of the adjacent end panel 14 or 16. The other side of this outer corner member 36b is placed against the inner surface of the outer wall 24 of the side panel 12. A short sheet of metal foil 44 separates the second side of the outer corner member 36b from the outer wall 24 and also bridges the gap between that corner member and the adjacent block 20 of the outer layer 18 of the side panel 12. It will be noted that the end of the adjoining block 20 of the outer layer of the side panel 12 is cut on an angle to provide a complementary surface to the base of the outer corner member 36b. The end of this adjacent block 20 substantially covers one-half of the base of the adjoining corner member 36b. The other half of the base of each of the outermost corner members 36 lies next to the end of an adjacent block 20 of the middle layer of the respective end panel 14 or 16.

At each corner the aforementioned metal foil sheeting 42 is placed along the outside face of the middle layer of the respective end panel 14 or 16 and continues from there along the interface between the end of that layer and the base of the outer corner member 36b, and from there along the inside face of the outside layer of the side panel 12. The inner corner member 36a bears a similar relationship to the inner layer 18 of the end panel 14 or 16 and the middle layer of the side panel 12. A metal foil sheet 42 is placed across a portion of the base of the inner corner member 36a and along the adjoining layers 18 of the end and side panels. The inner layer 18 of the side panel 12 is positioned between the two spaced vertical corner posts 32.

Figure 4:
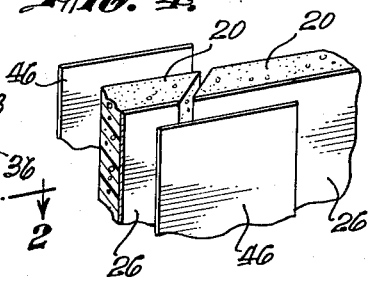
FIG. 4 is a fragmentary, exploded, isometric view of a portion of one wall panel of the container.

It will be seen in FIGS. 2 and 4 that the adjoining ends of adjacent insulation blocks 20 of the insulation layers 18 are cut at an angle. Heretofore it has been the practice to use a square or 90° cut in the shaping of the blocks. With the conventional square cut blocks, the heat leakage is proportional to the width $w$ of the gap between adjacent blocks and is inversely proportional to the length $l$ of the gap. The heat leakage may be expressed as $$Q = k\frac{w}{l}$$

In the structure of the invention, the insulating blocks are cut on an angle and the effective width of the gap normal to heat flow is $w$ times the sine of the angle $\theta$ of the cut. The effective length of the gap is $$\frac{l}{\sin \theta}$$

and hence in the improved structure the heat leakage may be expressed as $$Q = \frac{w}{l} \sin^2 \theta$$

which is considerably less than the heat loss of $$k\frac{w}{l}$$

of the conventional structure. Furthermore, in a square cut block structure, it is essential that the gaps between adjoining blocks of adjacent layers be staggered. In the improved structure of the invention, as seen in FIG. 2, staggering is not required. Short foil sheets 46 are provided across the gaps between adjacent blocks 20 to block radiation.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:

1. In an insulated structure having adjoining wall panels meeting to form a corner, said wall panels each including at least two layers arranged in a side-by-side relationship, the improvement comprising:

at least two elongated corner members disposed lengthwise of said corner, said corner members having triangular cross sections with the bases of the triangles of the respective corner members being placed crosswise of the corner and with the apex of each succeeding inner corner member substantially abutting the base of the next succeeding outer corner member and with the layers of the respective adjoining wall panels having their respective ends cut to substantially parallel the bases of said corner members and with said layers of the adjoining wall panels being movable independently of the corner members.

2. An insulated structure in accordance with claim 1, wherein the corner members have cross sections of isosceles triangles.

3. An insulated structure in accordance with claim 1 wherein a sheet of metal foil extends along the outside face of one layer of one wall panel and continues along between the end of said layer and the base of a corner member and from there continues along the inside face of a layer of the other wall panel.

References Cited by the Examiner

UNITED STATES PATENTS

| | | | |
|---|---|---|---|
| 1,048,923 | 12/12 | Wheeler | 20—35 |
| 1,949,426 | 3/34 | Loy et al. | 20—92 |
| 2,458,925 | 1/49 | Barger | 20—92 |
| 2,702,412 | 2/55 | Asch | 20—4 |
| 2,785,099 | 3/57 | Holtsford | 20—4 |

HARRISON R. MOSELEY, *Primary Examiner.*

REINALDO P. MACHADO, *Examiner.*